United States Patent [19]
Morton

[11] Patent Number: 5,287,033
[45] Date of Patent: Feb. 15, 1994

[54] VIBRATING SURFACE GYROSCOPES

[75] Inventor: Donald F. Morton, Stevenage

[73] Assignee: British Aerospace Public Limited Company, London, England

[21] Appl. No.: 748,345

[22] Filed: Aug. 22, 1991

[30] Foreign Application Priority Data

Aug. 24, 1990 [GB] United Kingdom ............... 9018661

[51] Int. Cl.$^5$ ............................................. H01L 41/08
[52] U.S. Cl. ................................. 310/316; 310/321; 310/329; 310/359; 310/366; 73/505
[58] Field of Search ............... 310/328, 366, 321, 329, 310/316, 317, 318, 319, 358, 359; 73/505

[56] References Cited

U.S. PATENT DOCUMENTS

| | | | |
|---|---|---|---|
| 3,253,166 | 5/1966 | Osial et al. | 310/329 |
| 3,311,760 | 3/1967 | Durgin et al. | 310/329 |
| 3,408,872 | 11/1968 | Simmons et al. | 73/505 |
| 4,489,609 | 12/1984 | Burdess et al. | 310/329 |
| 4,655,081 | 4/1987 | Burdess | 310/329 |
| 4,689,992 | 9/1987 | Strachan | 310/329 |
| 4,987,334 | 1/1991 | Jungwirth | 310/328 |
| 5,049,776 | 9/1991 | Ogawa | 310/316 |
| 5,153,476 | 10/1992 | Kosinski | 310/313 R |
| 5,170,089 | 12/1992 | Fulton | 310/328 |

FOREIGN PATENT DOCUMENTS 0472424 2/1992 European Pat. Off. ............ 73/505

Primary Examiner—Mark O. Budd
Assistant Examiner—Thomas M. Dougherty
Attorney, Agent, or Firm—Cushman, Darby & Cushman

[57] ABSTRACT

A vibrating surface gyroscope includes a piezoelectric resonator 10 of material arranged to have a plurality of poles 12, 14 of opposite sense or polarity disposed around the sensing axis. The resultant bi-directional (forward and reverse) poling establishes the mode and modal position of a vibration in the resonator 10. One surface of the structure includes a surface electrode having a surface resistivity comparable with the reactance of the piezoelectric material adjacent resonance so that a bridge circuit can be made up of the electrode and the piezoelectric material. A wideband closed loop system provides feedback into the bridge to maintain it at balance and provides rate output. Scale factor compensation techniques are also disclosed as well as alternative electrode arrangements.

32 Claims, 18 Drawing Sheets

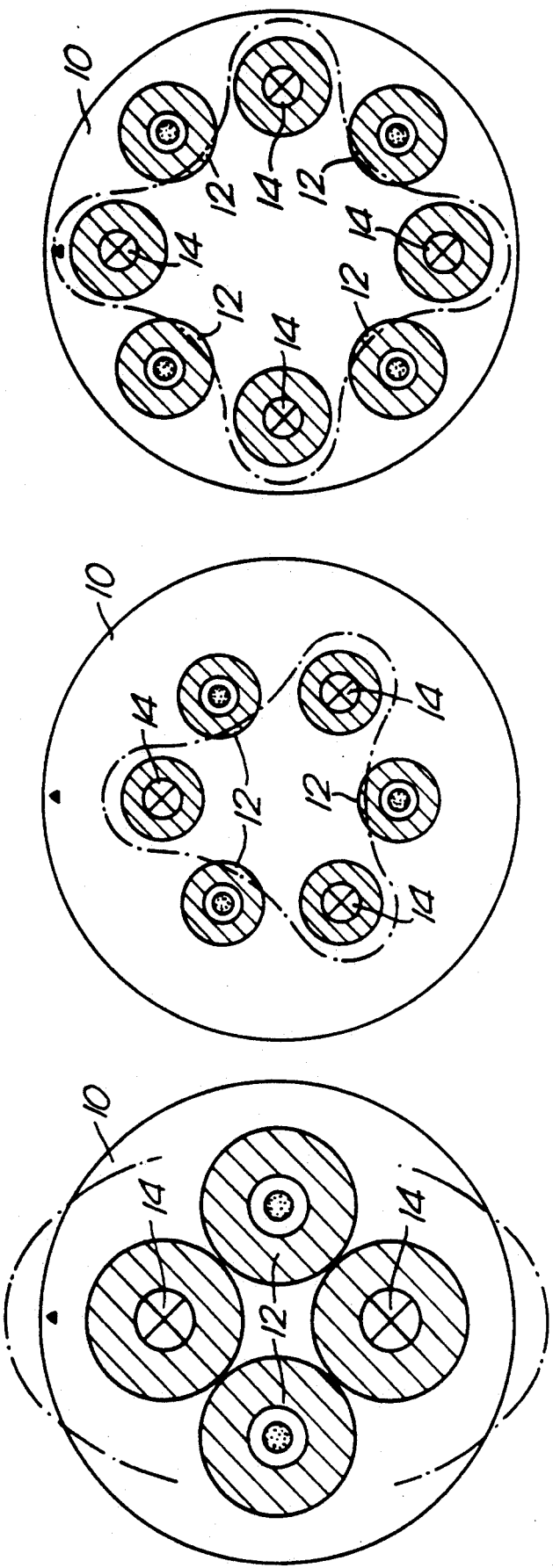

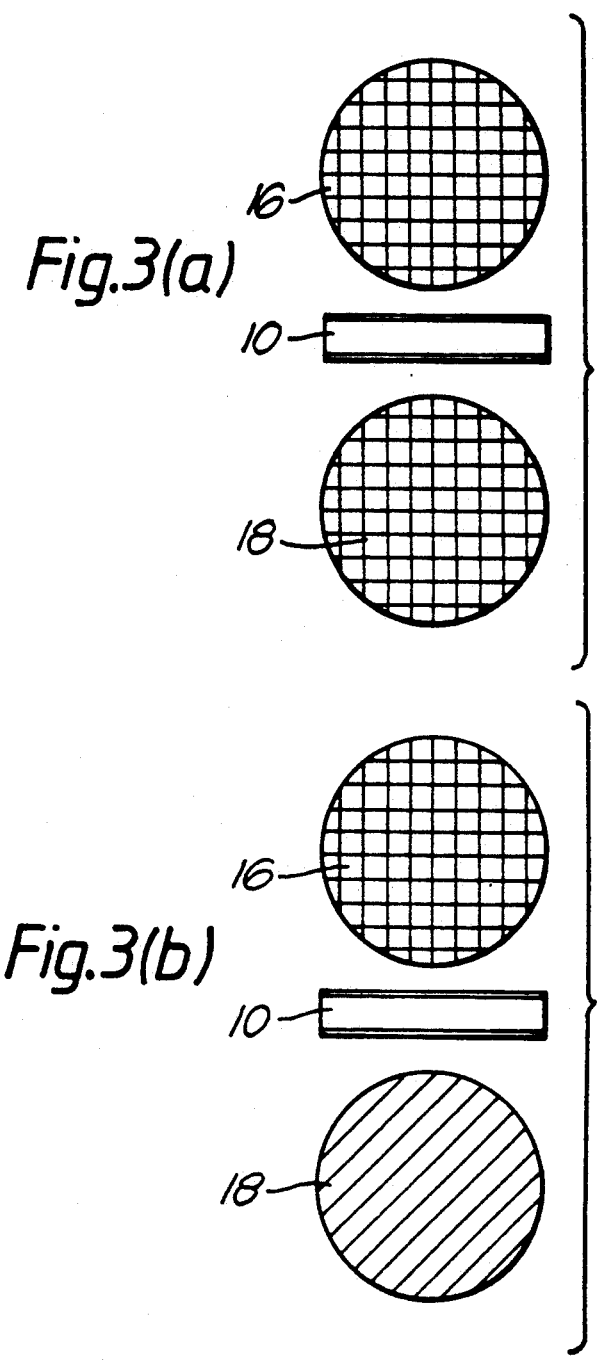

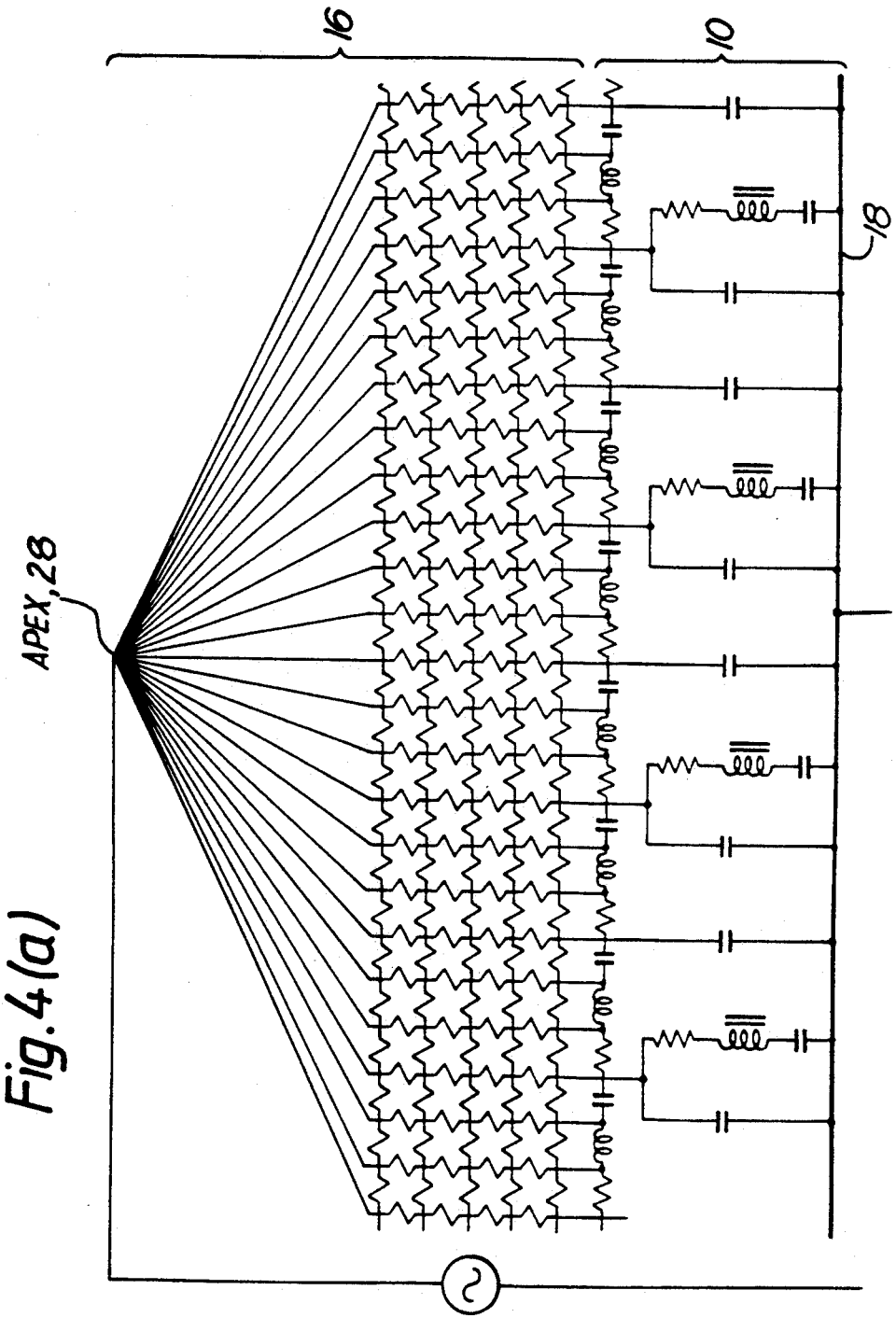
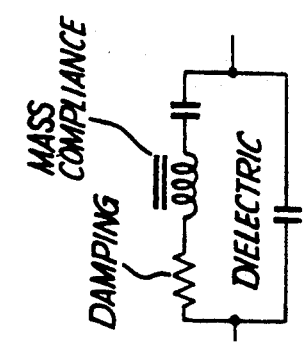
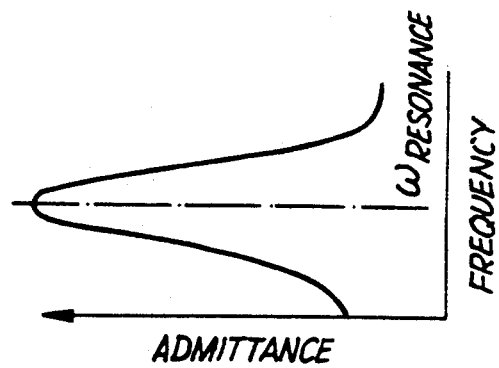
Fig.4(a)
Fig.4(b)
Fig.4(c)

- $t = \frac{\pi}{2}$
- $t = \frac{3\pi}{4}$
- $t = \pi$
- $t = \frac{5\pi}{4}$
- $t = \frac{3\pi}{2}$

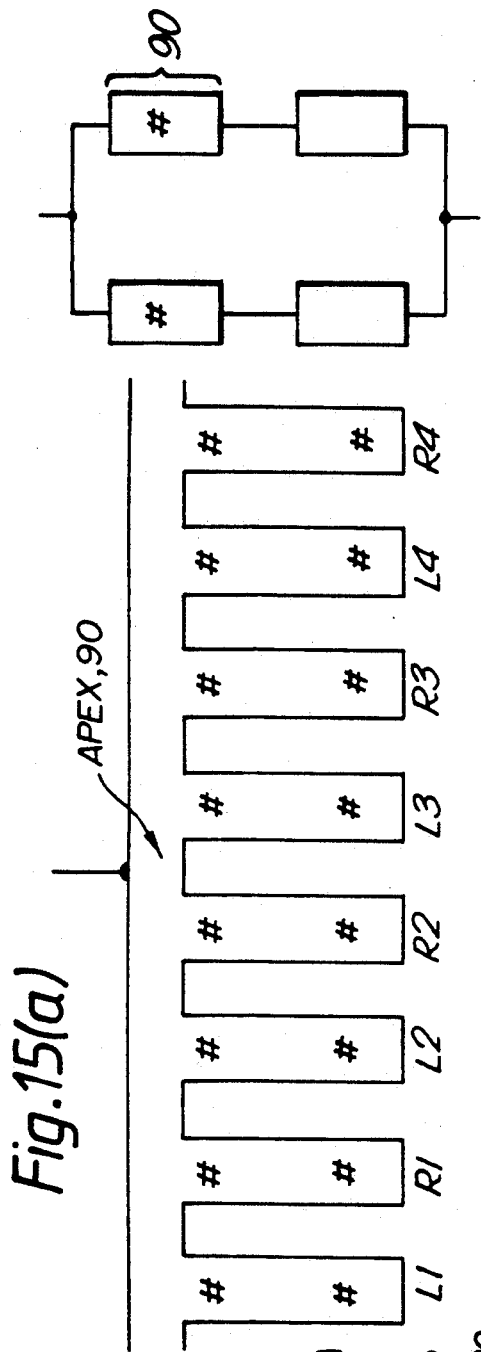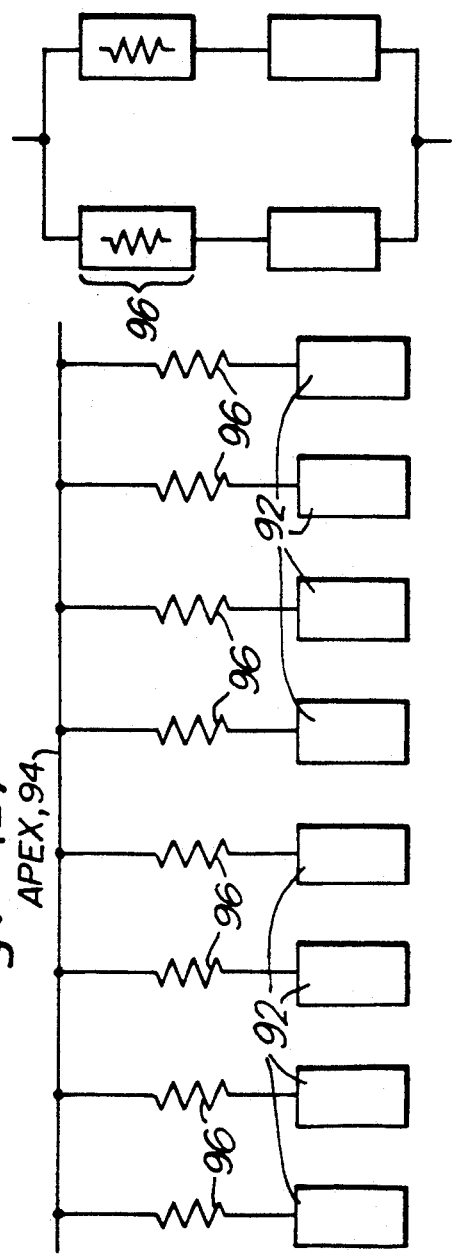
Fig.15(a)
Fig.15(b)
Fig.14

VIBRATING SURFACE GYROSCOPES

This invention relates to vibrating surface gyroscopes.

In one aspect, this invention provides a vibrating surface gyroscope comprising a sensing axis, a piezoelectric resonator structure, means for exciting said piezoelectric resonator structure to resonate, and means responsive to the electrical field generated on vibration of said structure to determine the rotation of said device, wherein said piezoelectric resonator structure includes a plurality of pole regions of alternate polarity disposed around said structure and each responsive to a voltage to set up a local tensile or compressive strain dependent on the polarity of said pole region, thereby establishing a predetermined modal pattern of vibration in use when said structure is excited.

Preferably, said pole regions are equispaced about said sensing axis. The resonator structure may be any suitable shape such as a disc, hollow cylindrical or hemispherical.

In another aspect this invention provides a vibrating surface gyroscope comprising a sensing axis, a piezoelectric resonator structure, means for exciting said piezoelectric resonator structure, and means responsive to the electrical field generated on vibration of said structure to determine the rotation of said device, wherein said means for exciting includes electrode means provided on two respective opposed surfaces of said structure and wherein one of said electrode means has a resistance per square comparable to the reactance of the piezoelectric material between the electrode means when the structure is adjacent its resonant frequency.

In another aspect this invention provides a vibrating surface gyroscope comprising a sensing axis, a piezoelectric resonator structure, means for exciting said structure and means responsive to the electrical field generated on vibration of said structure to determine rotation, said piezoelectric resonator structure including a plurality of pole regions of opposite polarity distributed around said sending axis whereby in use resonance of said resonator structure generates an electrical field which varies around said sensing axis, and wherein said means responsive to vibration of said structure comprises means for sampling the electrical field at spaced points on said piezoelectric structure and means for monitoring a rotation-induced shift in said field.

In another aspect this invention provides a vibrating surface gyroscope, comprising a sensing axis, a piezoelectric resonator structure, means for exciting said structure and detector means responsive to the electrical field generated on excitation of said structure to determine applied rotation, said excitation means including means for applying an alternating excitation signal to said piezoelectric resonator structure, wherein said device includes means operable in use to control said excitation means to bring the voltage of said excitation signal substantially into phase with the current thereof.

In another aspect this invention provides a vibrating surface gyroscope, comprising a sensing axis, a piezoelectric resonator structure, means for applying an excitation signal across said structure and including electrode means of predetermined surface resistivity, and means for obtaining at least two field sample signals representing the electric field across said structure at spaced locations, the electrode means and the piezoelectric structure together defining a bridge circuit, and means for adjusting said bridge circuit to provide a balance between said sample signals.

In another aspect this invention provides a vibrating surface gyroscope comprising a sensing axis, a piezoelectric resonator structure, first electrode means for exciting said piezoelectric resonator structure, second electrode means for detecting the electrical field generated in response to excitation of said piezoelectric resonator structure, said piezoelectric resonator structure having therein a plurality of pole regions of alternate plurality disposed about said sensing axis, said first and second electrode means each comprising discrete electrodes.

Whilst the invention has been described above, it includes any inventive combination of the features set out above or in the following description.

The invention may be performed in various ways and certain embodiments thereof will now be described, reference being made to the accompanying drawings, in which:

FIGS. 1(a), (b) and (c) illustrate schematically the poling configurations and modal patterns for a four- six- and eight-poled piezoelectric resonator structures have 2, 3, and 4 modal position respectively:

FIGS. 2(a), (b) and (c) give examples of a disc, a hollow cylindrical and a hemispherical piezoelectric resonator structure respectively;

FIGS. 3(a) and (b) illustrate electrode configurations for a dual surface field and a single surface field respectively;

FIG. 4(a) is an equivalent electrical circuit for a four pole arrangement having the single surface field configuration of FIG. 3(b), and FIGS. 4(b) and 4(c) are an equivalent electrical circuit of the piezoelectric material, and its admittance response, respectively.

Figure 6A:
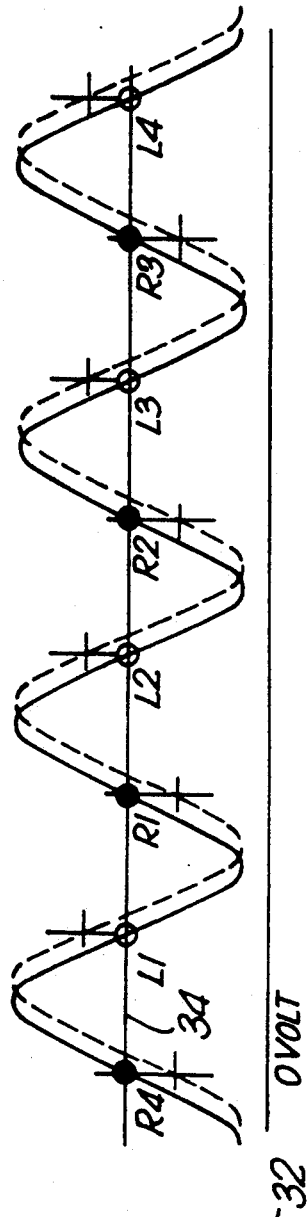
Figure 6C:
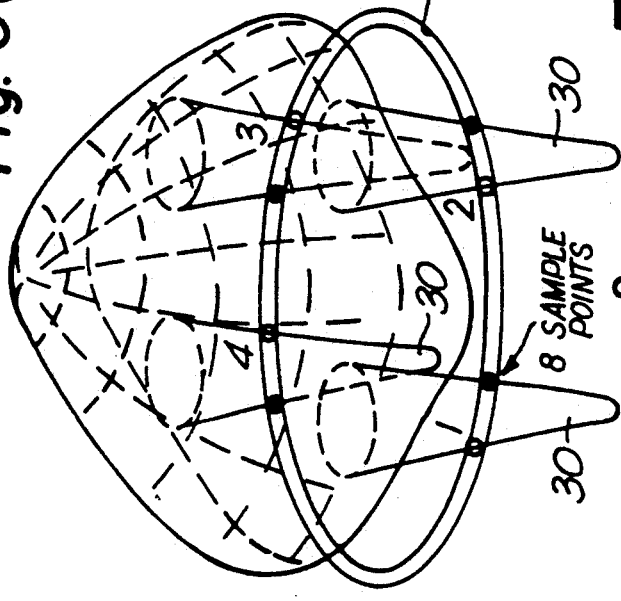
Figure 6B:
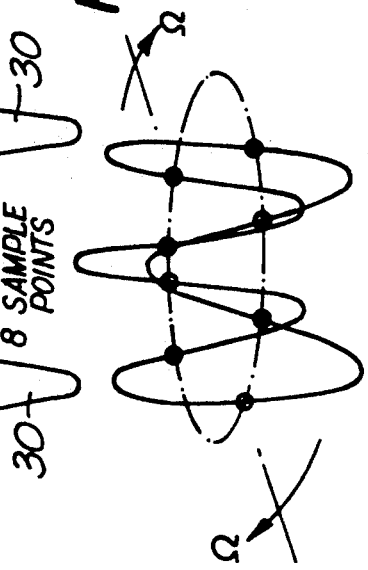
Figure 7B:
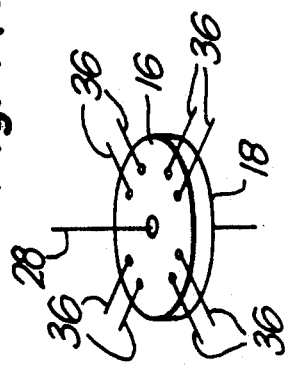
Figure 7C:
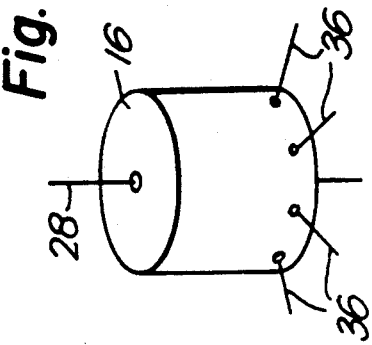
Figure 7D:
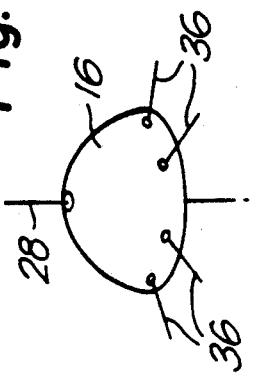
Figure 7A:
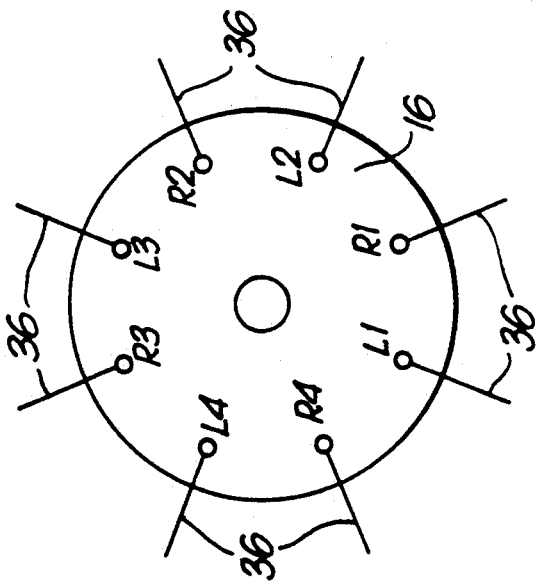
Figure 8:
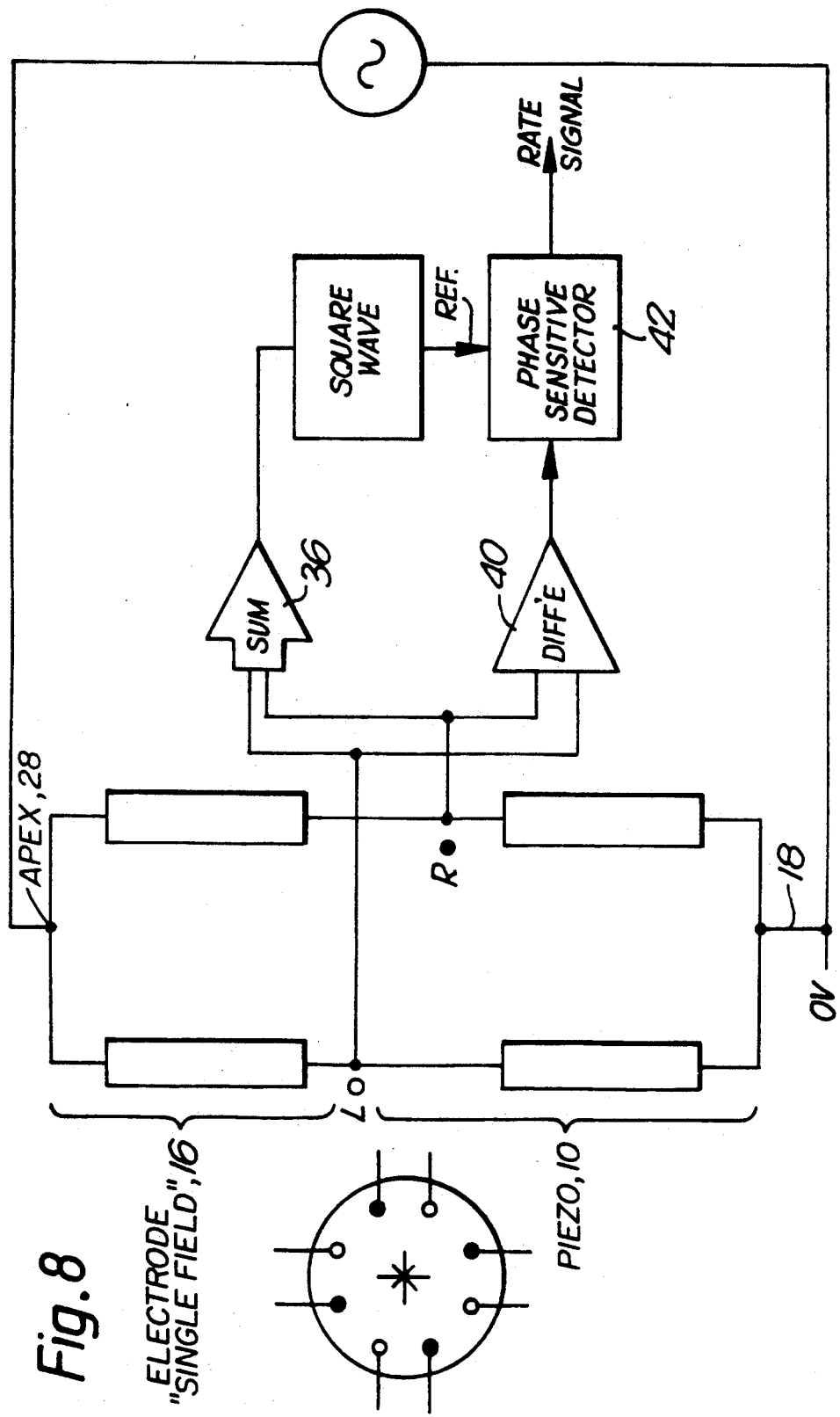
Figure 9:
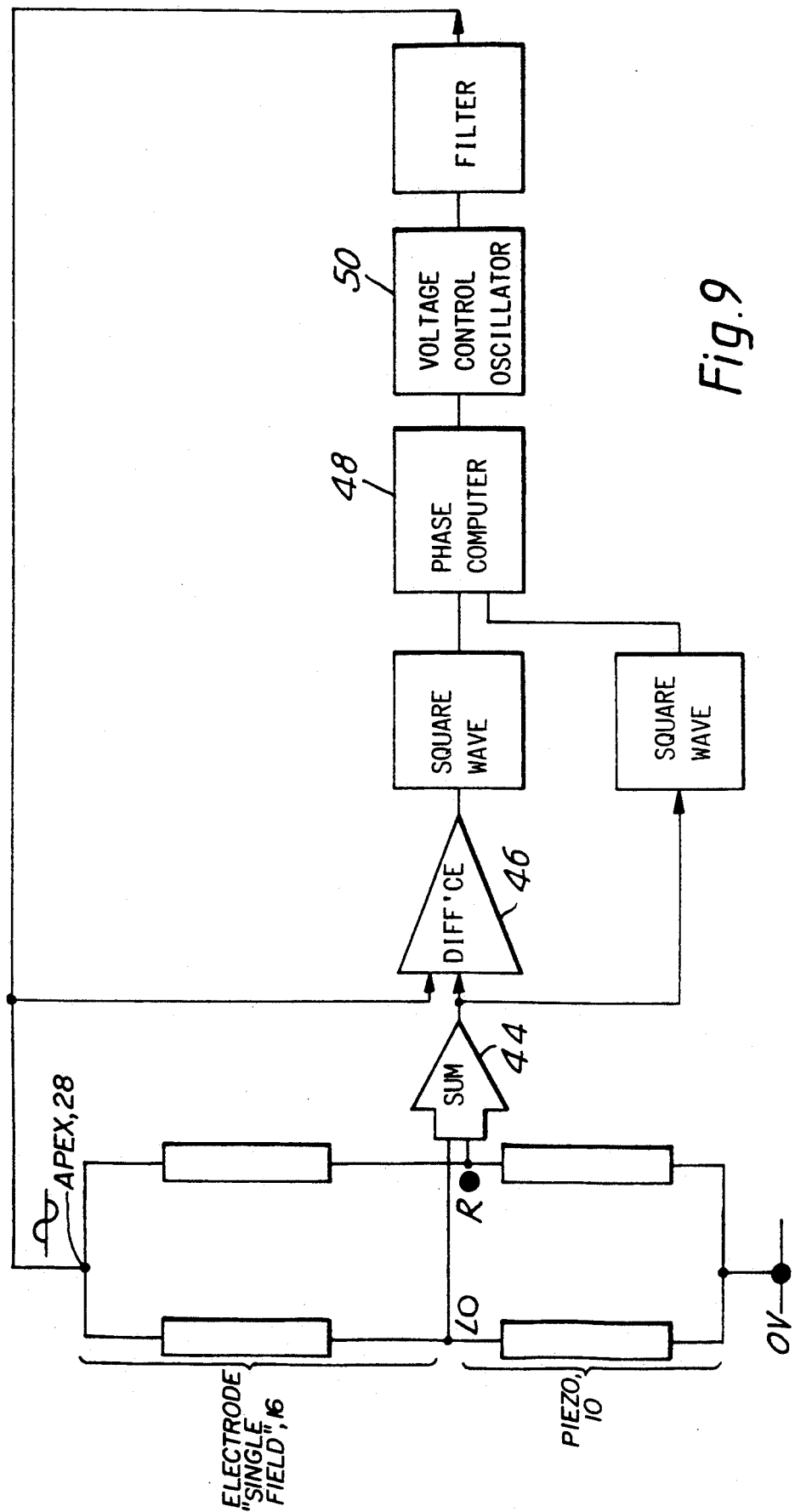
Figure 10:
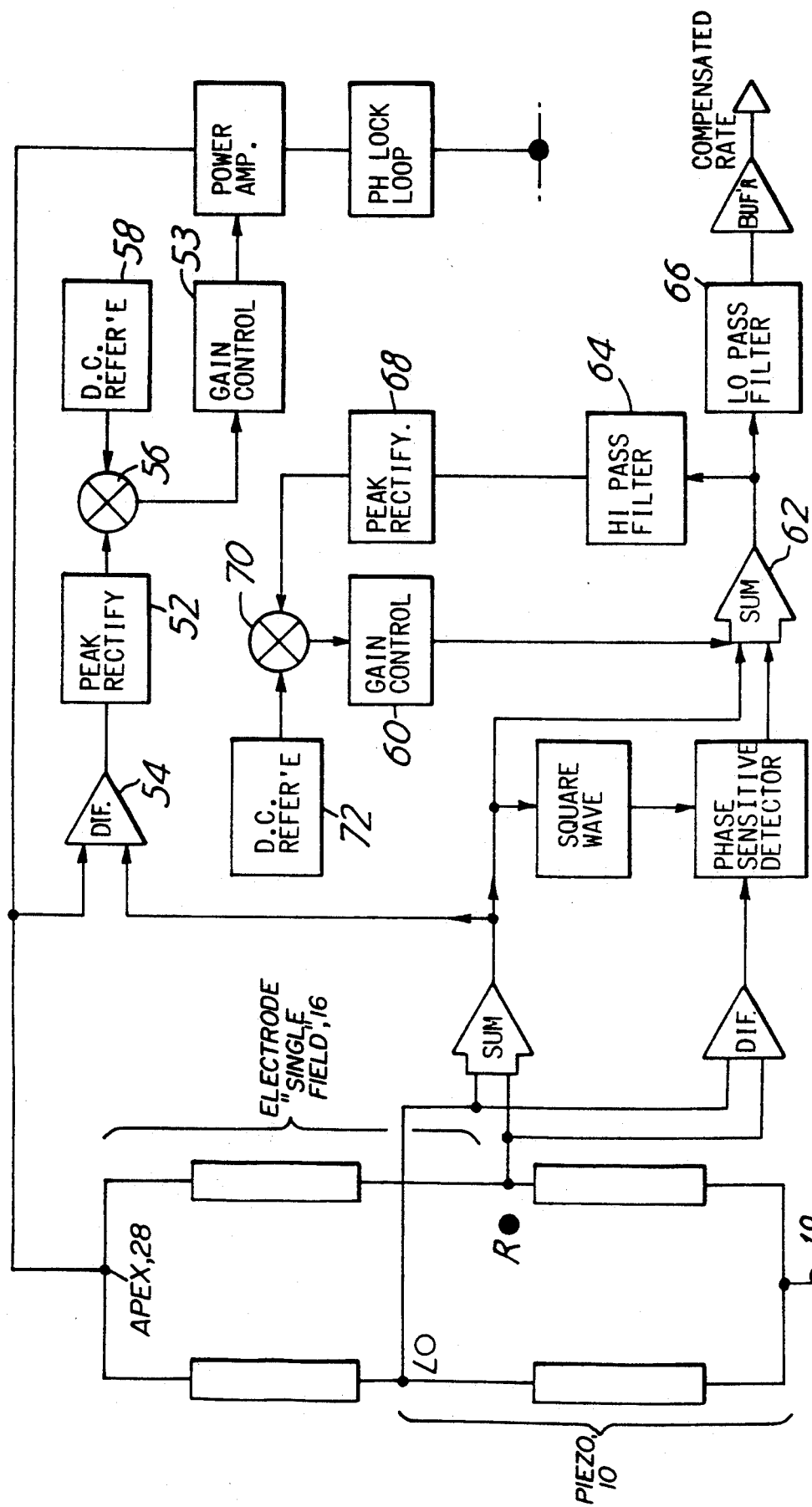
Figure 11:
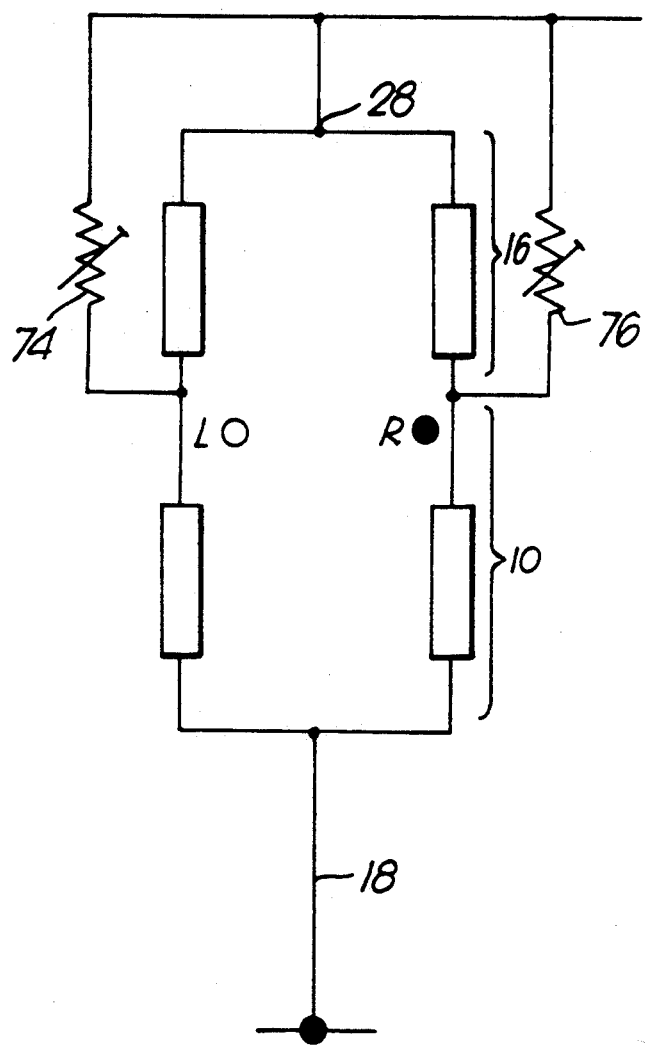
Figure 12:
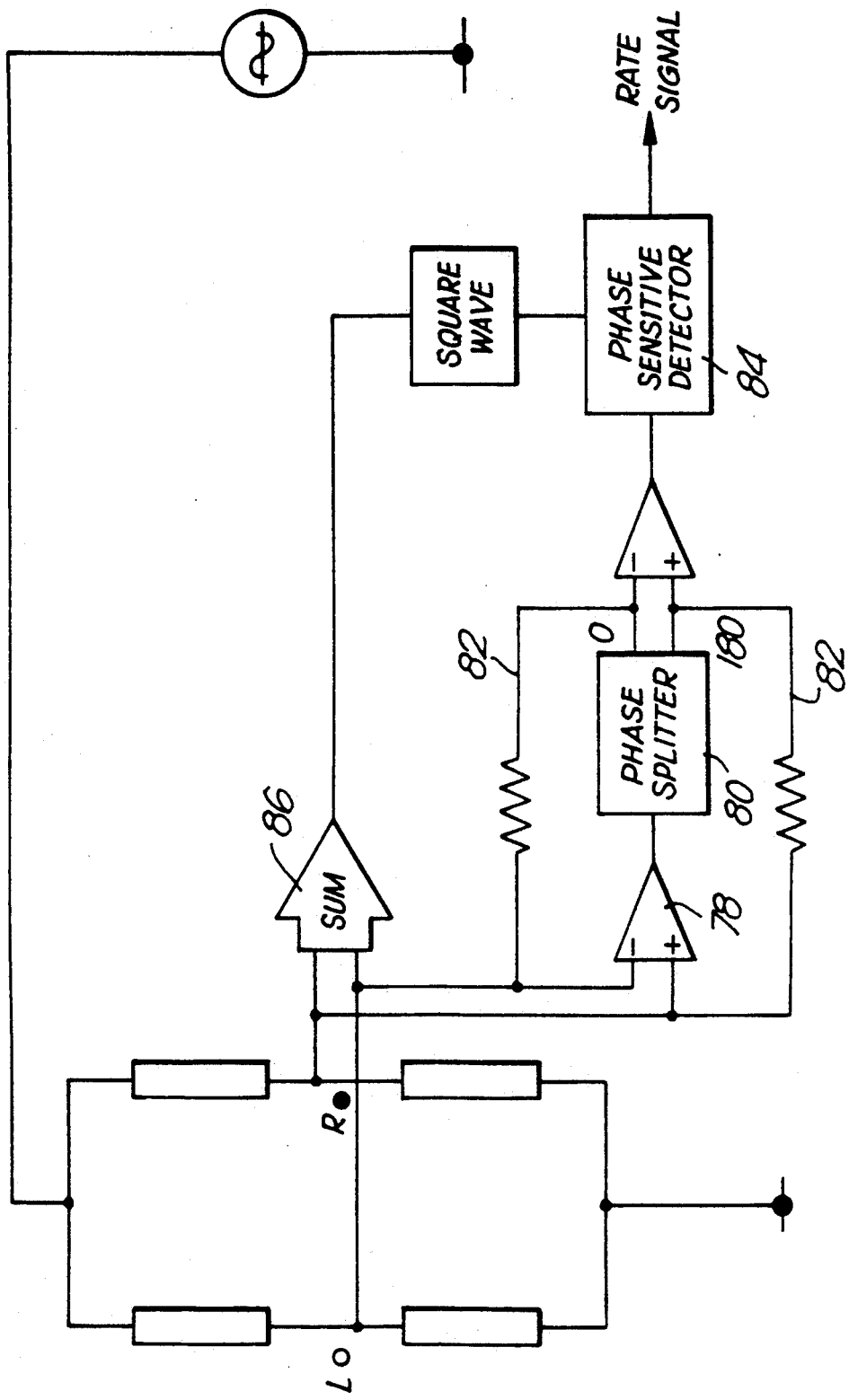
Figure 13:
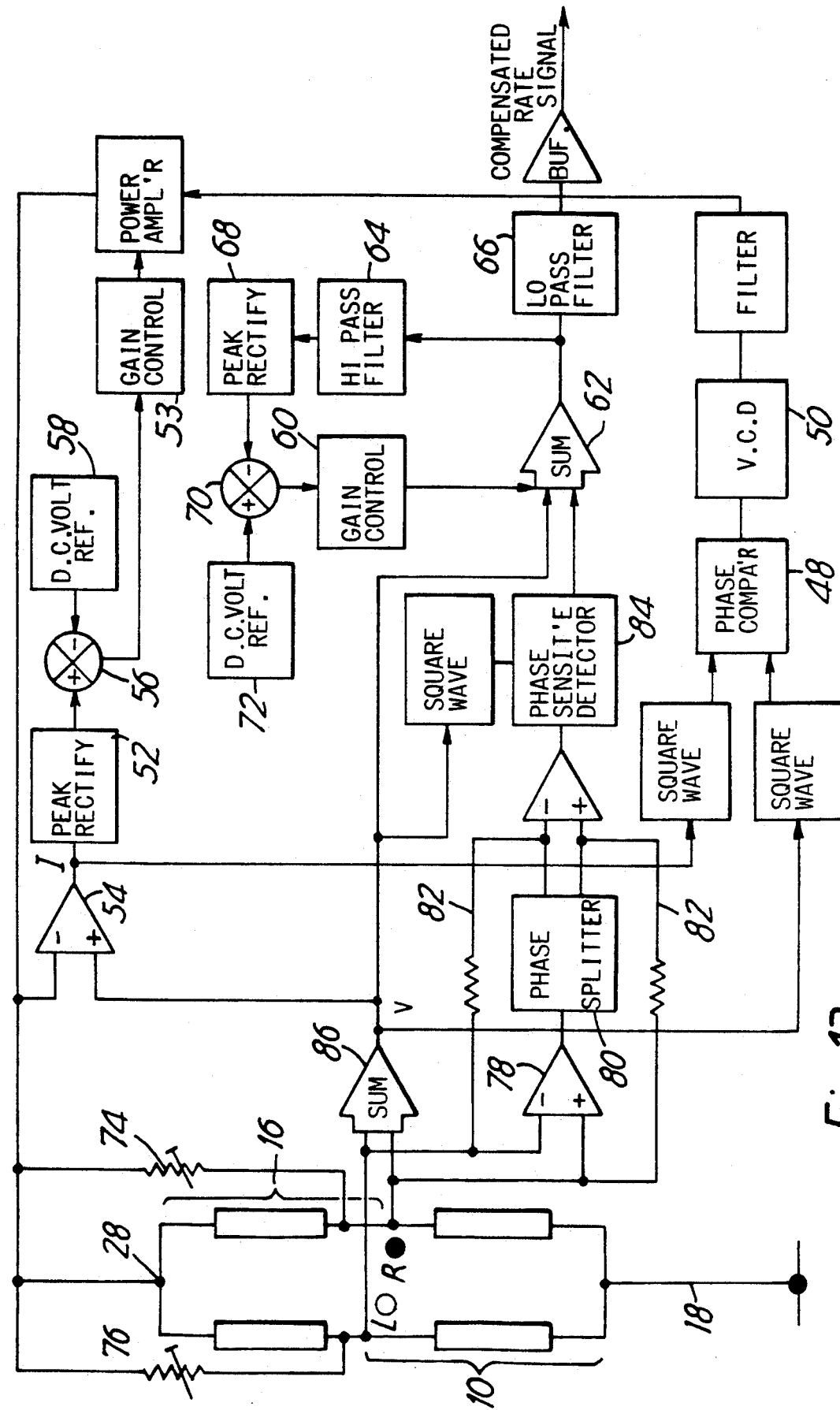
Figure 16:
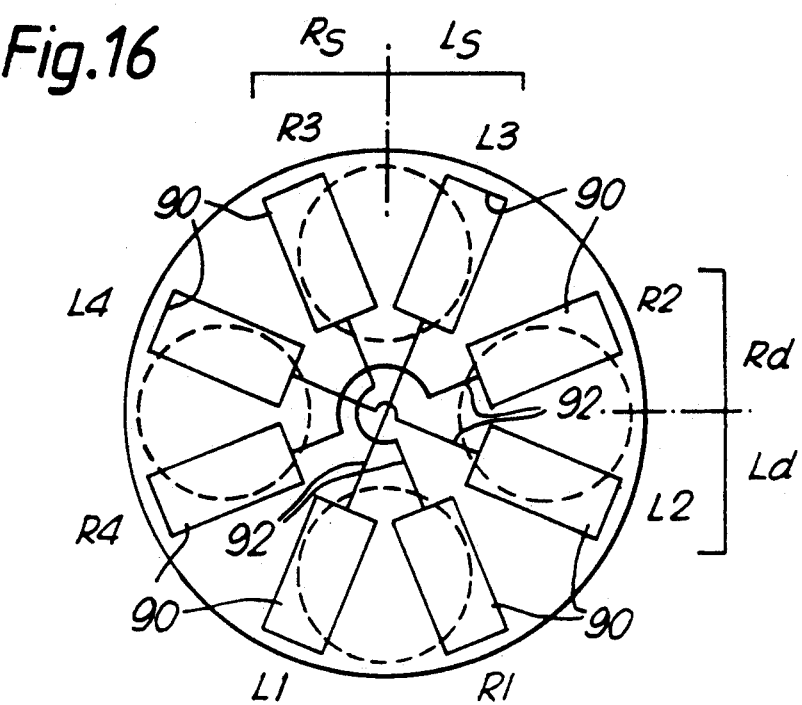
Figure 17:
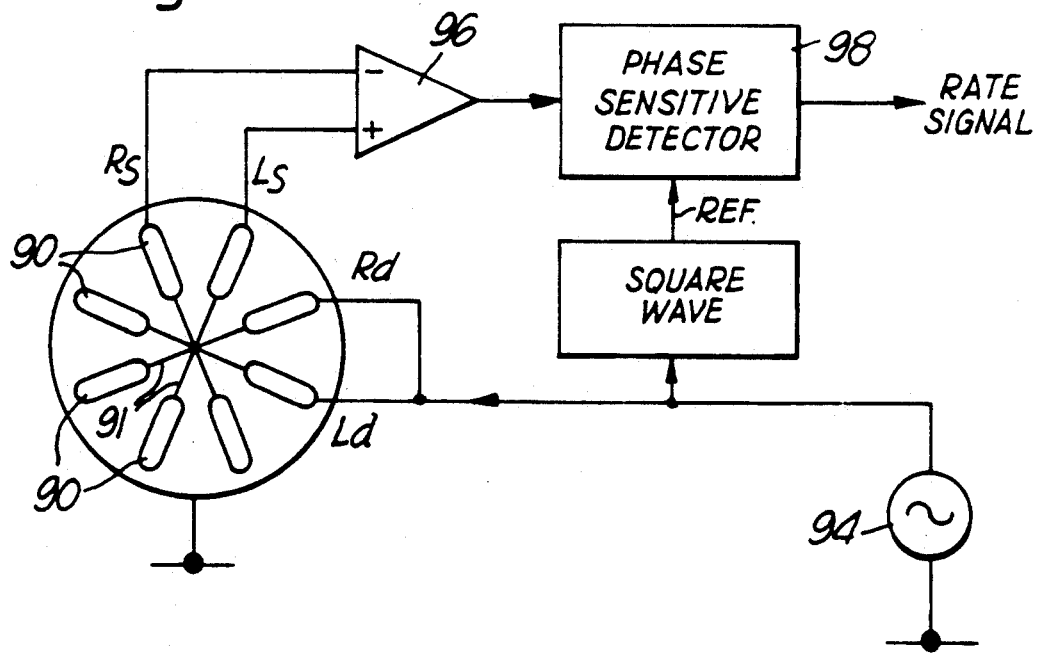
Figure 18:
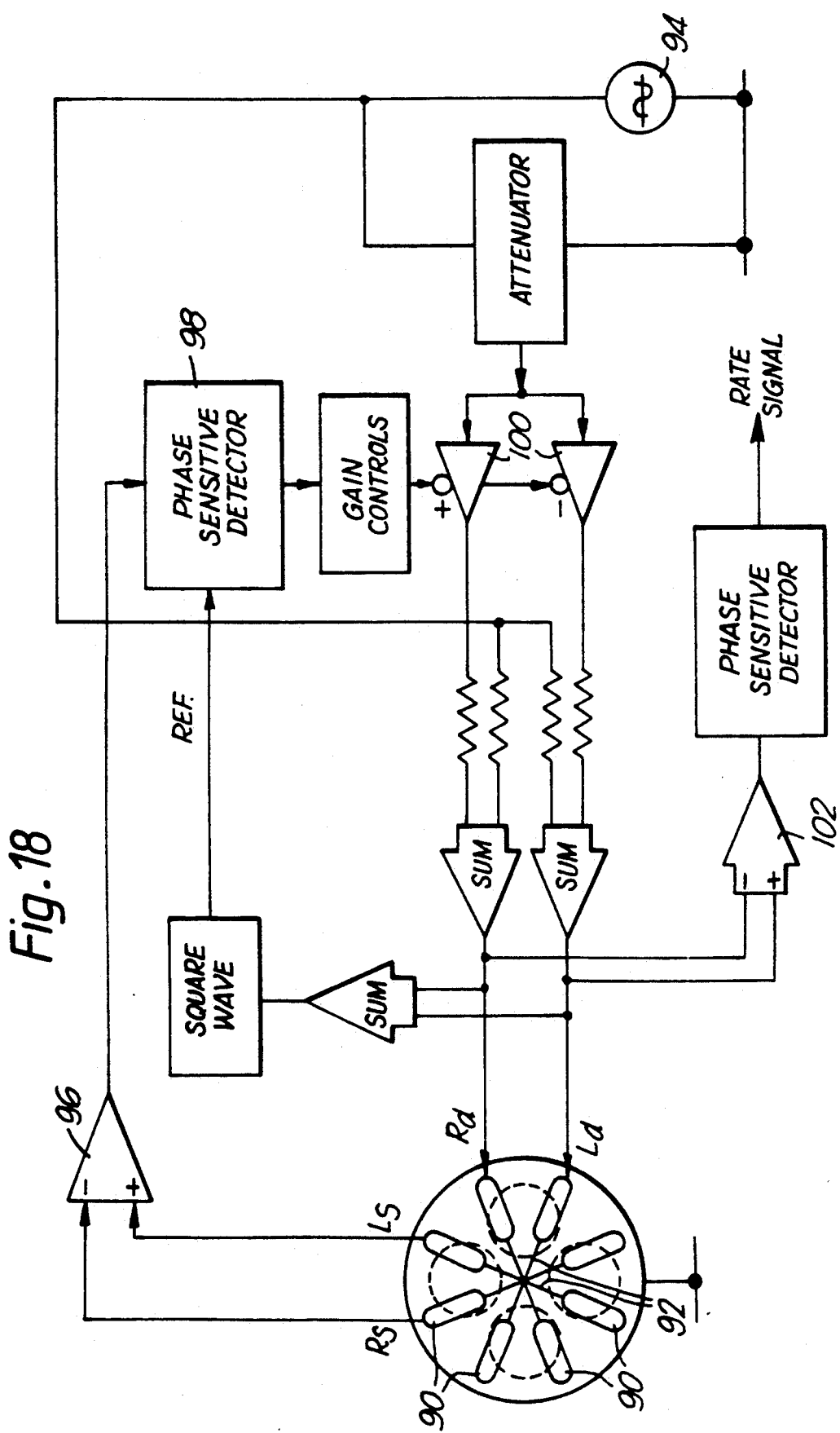
Figure 19:
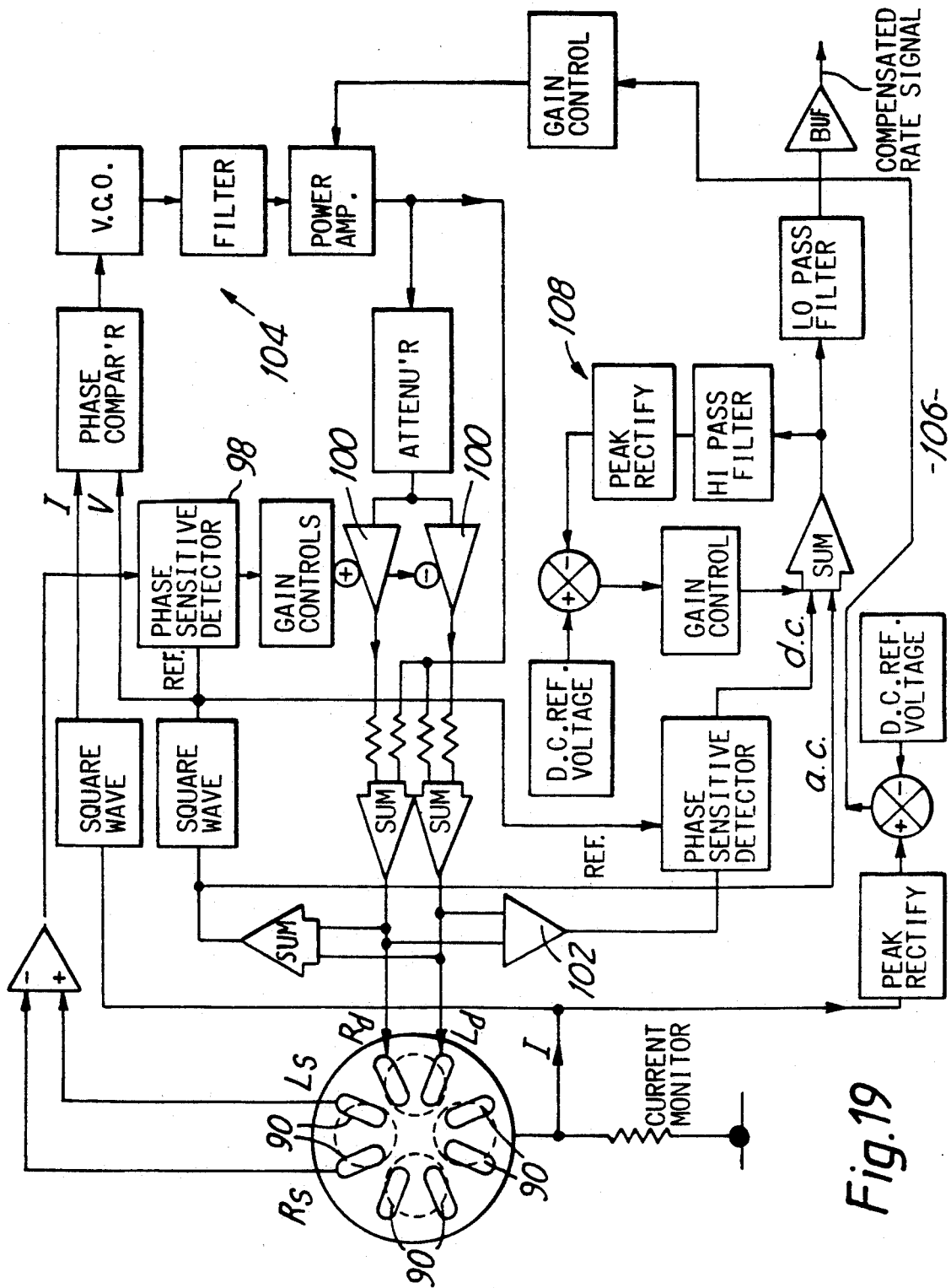
Figure 20A:
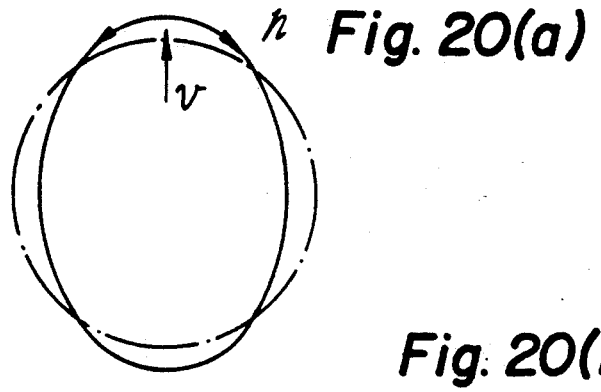
Figure 20B:
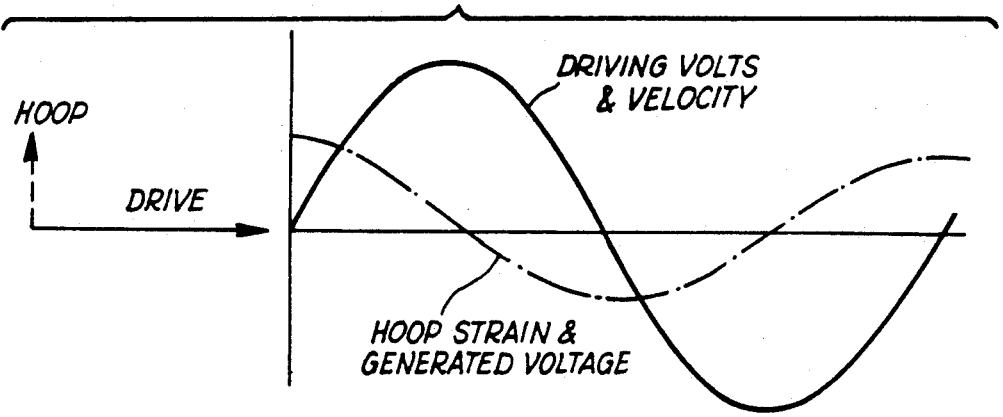
Figure 20C:
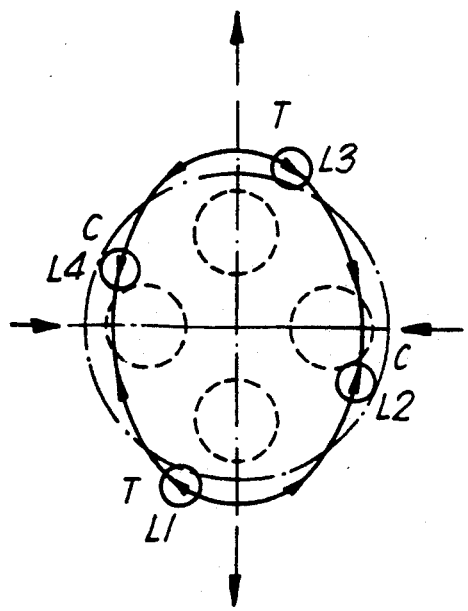
Figure 20D:
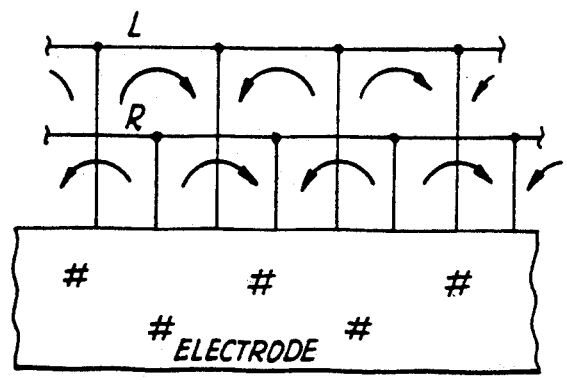

FIGS. 6(a)–6(c) illustrate the electrical field of a four pole arrangement at resonance and illustrates the selection of a circumferential sample element;

FIGS. 7(a)–7(d) illustrate the electrode configurations for four pole single field resonator structures for disc-, hollow cylindrical- and hemispherical resonators;

FIG. 8 illustrates a first embodiment of gyroscope employing a bridge technique for detecting movement of the electrical field sample in FIG. 7;

FIG. 9 illustrates a second embodiment of gyroscope incorporating phase locked loop for tuning the gyroscope;

FIG. 10 illustrates a third embodiment of gyroscope incorporating scale factor compensation;

FIG. 11 illustrates a method for balancing the bridge circuit of the gyroscope of any of FIGS. 8 to 10;

FIG. 12 illustrates a fourth embodiment of gyroscope incorporating a closed loop control;

FIG. 13 illustrates a fifth embodiment of gyroscope incorporating automatic tuning, scale factor compensations and null trim;

FIG. 14 illustrates an alternative electrode scheme for a four pole arrangement, in which the first electrode is in the form of a series of discrete electrodes;

FIGS. 15(a) and (b) illustrate two equivalent electrical circuits for discrete electrodes with significant surface resistivity and for discrete electrodes with negligible surface resistivity but with external resistance respectively;

FIG. 16 illustrates the location and interconnection of the discrete conductive electrodes for a four pole arrangement;

FIG. 17 illustrates a sixth embodiment of gyroscope with discrete conductive electrodes and operating as an open loop sensor;

FIG. 18 illustrates a seventh embodiment of gyroscope with discrete conductive electrodes and operating as a wide bandwidth closed loop sensor;

FIG. 19 illustrates an eight embodiment of gyroscope with discrete conductive electrodes, operating as an open loop sensor with automatic tuning, and scale factor compensation, and FIGS. 20(a)-20(d) illustrate how the quadrature (hoop) voltage may be reduced in the lead out points in the arrangements of FIGS. 11 et sec.

There is described below a novel approach to driving a piezoelectric structure into a multi-mode hoop vibration, while providing the means to detect an angular rate input.

Two electrodes only are required together with a single source of A. C. voltage for drive alternatively configured devices in push-pull symmetry. A discrete electrode form is also considered.

The following description is in six parts, as follows:
Multi-mode bi-polar drive of a piezo structure.
Generation of an electric surface field.
Detection of Rate.
Scale factor compensations.
Wide bandwidth Response from Feedback.
Extension to Discrete Electrode forms.

Multi-mode bi-polar drive of a piezo structure

Figure 2A:
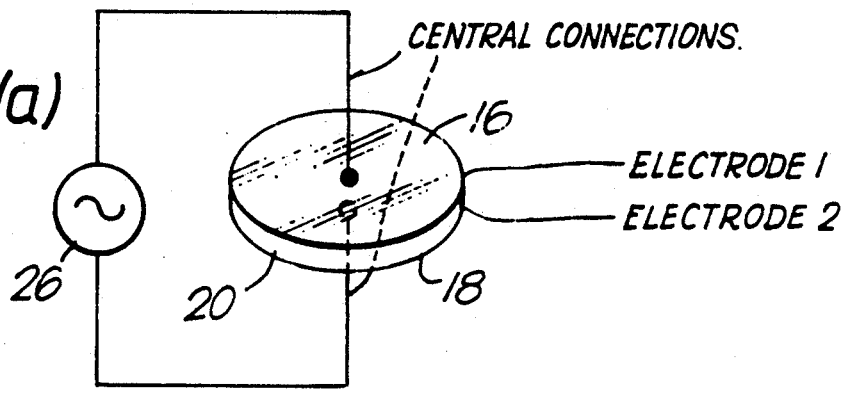
Figure 2B:
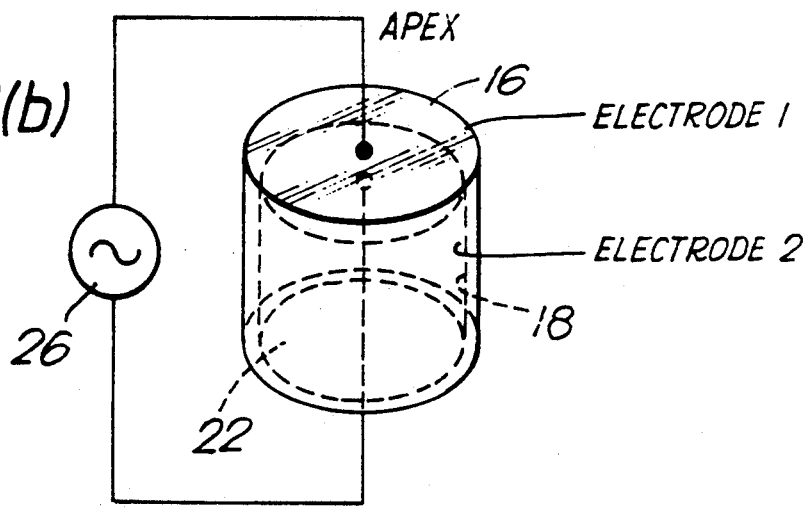
Figure 2C:
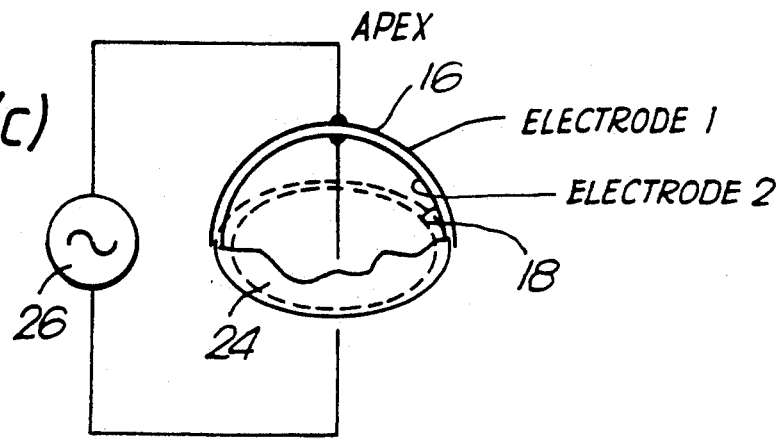

FIGS. 1(a)-1(c) illustrate the principle of bi-directional (forward and reverse) poling of a piezo structure 10 to establish the mode and nodal position of a vibration in the structure. The arrangement establishes a distribution of poles 12, 14 of opposite polarity of bi-poles much in the manner that poles are distributed in the field circuit of a motor. It follows that if continuous electrodes 16, 18 are placed one to each side of the structure 10, FIGS. 2(a)-2(c) whether it be a disk 20, a cylinder 22, a hemisphere 24 or any similar combination, then application of a D. C. voltage of fixed polarity across these electrodes 16, 18 will set up alternate tensile (expansive) and compressive (contracting) strains according to the direction of the poling (or polarity) and its spatial placement in the material as preestablished during manufacture.

It further follows that if an alternating voltage is applied e.g. by source 26 and frequency is tuned to the principle Eigen value, corresponding to the modal pattern poled into the structure 10, then the structure 10 will resonate achieving an amplitude of displacement dependant on the drive voltage, piezoelectric coefficient of strain and damping loss in the structure.

Generation of an electric surface field

Referring to FIGS. 3(a)-3(c), the required electric surface field is generated by special selection of the electrodes. Both electrodes 16, 18 are fabricated to a uniform thickness over the surface of the piezo element. Either both electrodes 16, 18 or just one of the pair 16 has a resistance per square (i.e., resistance per area of the electrode surface) or surface resistivity comparable, in part, to the reactance of the piezoelectric material between the electrodes 16, 18 when it is near to but detuned from the frequency of mechanical resonance. This is so that a voltage applied between the centre of apex 28 of the electrodes will set up a surface electric field across each or one of the electrodes, which can be used to detect an angular rate input when the structure is returned to mechanical resonance.

The "single surface field" arrangement, FIG. 3(b), is depicted electrically in FIGS. 4(a)-4(c) for four poles, and a vibration mode m=2. It follows from symmetry that the dual arrangement FIG. 3(a), can similarly be depicted by inserting a mirror image equivalent of the first electrode 16 in place of the conducting electrode 18.

It will become clear that more electrical connections are required with the dual field arrangement so that in general it follows this is the less preferential form.

The following discussion applies equally to both dual and single field devices, but for ease of description, reference, in general, will be made only to the single field form.

Figure 5A:
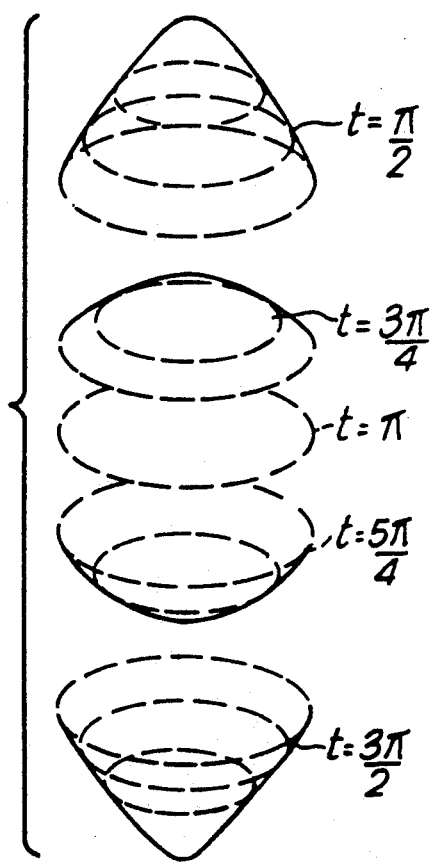
FIG. 5(a) illustrates the surface field at one electrode (electrode 1) of a four pole arrangement, in terms of the variation of voltage with time when the piezoelectric structure is detuned.

The effect of a rate input is most easily observed by first detuning the arrangement where the "surface" field, FIG. 5(a) will follow contours of symmetry, best described for a simple disk. Lines of constant voltage will follow contours which can be likened to contours of constant altitude or depth on a survey map, changing continuously between peak and trough as the supply voltage alternates in time. As shown in FIG. 5(a) the top contour at v=+pk and t=$\pi/2$, changes to each subsequent contour at t=$3\pi/4$, $\pi$, $5\pi/4$ and $3\pi/2$ reaching V=−pk.

Figure 5B:
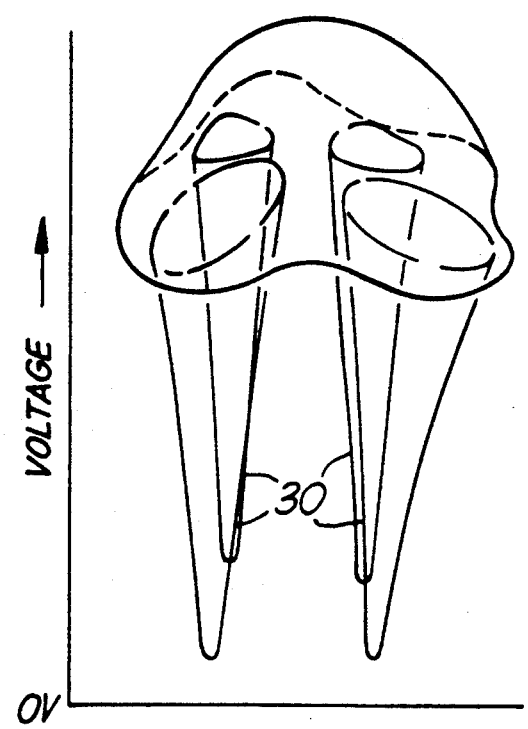
FIG. 5(b) is a conceptual view of the surface field at one electrode of a four pole arrangement when the piezoelectric structure is at resonance.

It follows that the surface map of voltage will develop strong additional troughs 30 and peaks over the poled areas as shown for example, FIG. 5(b) having 4 poles and 2 modes, when the arrangement is tuned back into mechanical resonance at which condition the dynamic admittance is a maximum under the poles.

It further follows that a rate input about an axis normal to the plane of the example chosen, will set up Coriolis forces which will cause a small circumferential shift of the poled voltage peaks and troughs relative to a fixed datum mark on the disk, which may be electrically detected and calibrated against input rate.

Detection of Rate

Referring now to FIGS. 6(a)-6(c), there is now described a method by which means an angular input rate can be detected and an electrical D. C. signal voltage be derived to give direction and magnitude of the input rate which is largely independent of precise tuning.

The poles may be salient or sinusoidally distributed, as shown in FIGS. 6(b) around a circumference, determined by the configuration of the poling field chosen in the manufacture of the piezo element, the position of the poles accurately indexed to a physical feature on the structure.

It is convenient to consider a four pole arrangement (m=2) and the single field disk model.

Consider a circumferential sample element 32, as shown in FIG. 6(a), passing through the poling zones 30, 11 the voltage distribution along this element is laid out in a linear form, it is observed that a constant reference voltage plane 34 can be placed across the field cutting the field at eight points.

Let the troughs or peaks called 1, 2, 3, 4 and the eight points L1, R1, L2, R2, L3, R3, L4, R4, where L is the left face or slope and R is the right face or slope.

Very fine wires 36 are attached to these points L1, R1, L2, R2, L3, R3, L4, R4, as shown in the different embodiments of FIGS. 7(a)-7(d), so that voltages can be measured. Consider one pair, say L1 and R1 connected to two amplifiers, one a summing amplifier 36, the other a differential amplifier 40 with good common mode rejection, as shown in FIG. 8.

The output of the differential amplifier is fed into a phase sensitive detector 42 taking its reference from the output of the summing amplifier 36. If there is no applied rate, it follows that no output will be observed.

When a rate is applied there will be a circumferential displacement of the vibrations in the disk and the corresponding field, as shown in FIG. 6(c), so that, as shown in FIG. 8, L1 and R1 will measure a differential voltage which will be phase-detected to give either a positive or negative voltage output from the phase detector 42, depending on the rate input sign, while amplitude will measure rate.

By inspection it follows that an identical output will be measured by the other three pairs of connections so that L1, L2, L3 and L4 may all be commoned, also R1, R2, R3 and R4 where the equivalence of FIGS. 4(a)-4(c) will reduce to the simple four element bridge as shown in FIG. 8.

The input impedance of the sum and difference amplifiers should be sufficiently high not to influence the electrode field.

When the device is manufactured to good symmetry and balance, zero rate output should remain stable with detune, although sensitivity of signal to rate will be reduced. This will also occur where the piezo coefficient changes with temperature. Because mass and compliance do not essentially change, the latter is reflected as a change in damping loss.

Scale Factor Compensations

Tuning of the device compensate scale factor compensation will now be described with reference to FIG. 9.

It is characteristic at mechanical resonance that the admittance between electrodes 16, 18 is a maximum, approaching unity power factor (refer to FIG. 4).

The electrode resistance and the voltage measured between the apex (supply) and the mean of the signal point connections L1-4, R1-4, provide a ready means to measure current (velocity).

The voltage across the piezoelectric element 10 may therefore be brought into phase with the current by comparing the phase of the current and the phase of mean signal point voltage to ground and using a voltage controlled oscillator in a phase locked loop configuration, to keep the arrangement tuned. Thus, in FIG. 9, the signals sampled at L1 to L4 and R1 to R4 are summed at 44 and the sum is supplied to a differential amplifier 46 which is also supplied with the voltage between the apex 28 and the mean of the signal point connections L1-4 and R1-4. This provides an indication of the current. The output of the summing amplifier 44 indicates the voltage. The phases of the current and voltage are compared by a phase comparator 48 the output of which controls a voltage controlled oscillator 50.

For the scale factor there are two elements to compensate, firstly changes in displacement or amplitude of the vibrations and secondly changes in damping resistance.

Compensation is achieved in two parts, as shown in FIG. 10.

Firstly, for the current, an automatic gain control 53 is operated to keep the current constant by increasing or decreasing the apex A.C. voltage via a low bandwidth loop. This is achieved by peak rectifying at 52 the voltage between apex and mean signal points supplied by a differential amplifier 54 and comparing with a D.C. voltage reference 58.

Secondly, for the damping resistance, an actual gain control 60 is placed in the forward rate signal processing to increase or decrease the scale factor to compensate a change. This is based on a comparison of mean signal point to ground peak rectified voltage and a fixed D.C. reference voltage, where an error signal is generated to adjust the forward signal gain.

Referring to FIG. 10, the mean signal point A.C. voltage is summed with the rate detected signal through a gain controlled amplifier 62. The output of the amplifier is split into A.C. and D.C. signal components using a high-pass (64) and low-pass (66) filter. The A.C. voltage is used to control the gain after peak rectification at 68 and comparison at 70 with a D.C. reference 72.

There will now be described a means of applying feedback to achieve a wide bandwidth response and improved linearity.

So far the device has only been described for open loop sensing of angle rate input where the bandwidth is limited to a frequency range 0 to $f^{90°}$ Hz, equal to the difference in frequency of the two half power points to either side of mechanical tuned resonance, as determined by the resonant frequency of the structure and its quality factor Q.

It is convenient to consider first that additional resistance in the form of external discrete components 74, 76 can be added to the bridge (made up of the surface resistance electrodes 16 and the piezo structure 10) as shown in FIG. 11, to bring about a balance between the signal points (L & R) should an unbalance exist from poling or field resistance (or combination thereof) as a result of imperfect manufacture. This additional resistance is selectable (one component would suffice).

It follows that in a similar manner additional resistance may be connected and suitable voltages applied to pull the bridge back into null when a rate input is applied and this arrangement is chosen as shown in FIG. 12, for one of possible alternative feedback options.

For this first option as shown in FIG. 12, a bridge output voltage, from rate input, is difference amplified at 78, (to give an adequate feedback loop gain), and is phase split at 80 into 0° and 180° components of equal magnitude, which return current to the bridge through two equal (balanced) resistors 82 to cause a rebalance of the bridge.

The two component voltages (0° and 180°) are different and phase sensitive detected at 84 to give a rate signal output.

The reference for the phase sensitive detector is derived by summing the mean voltage across the piezo element at 86 regenerating as a square wave.

It follows as the consequence of the feedback control described that bandwidth may be extended as determined by loop gain and phase stability criteria.

It further follows that automatic tuning and scale factor compensations are also applicable to the closed loop form of operation as shown in FIG. 13 which incorporates features from the embodiments of FIGS. 9, 10, 11 and 12. Similar components are given like reference numerals and will not be described again. In brief, the embodiment of FIG. 13 incorporate closed loop control (FIG. 12) to maintain the bridge circuit in balance, plus adjustable resistance components (FIG. 11) for initial setting up of the balance. A phase lock loop (FIG. 9) maintains the apex voltage and current in phase. A current loop and a damping correction loop (FIG. 10) provide scale factor compensation.

Extension to Discrete Electrode Forms

There will now be described an extension of the above techniques for use where the "continuous" resistance field electrodes (double field model) or electrode (single field model) are replaced by "discrete" or separated electrodes should this be a preferential form for the user.

In the above embodiments which use the alternate poling for the chosen mode of vibration it is preferential that the centre line of these discrete electrodes 88 shall be placed between peak and zero poled regions (labelled maxima and minima), as shown in FIG. 14, in order to provide a means to detect a rate input. The poles in FIG. 14 are shown by dashed circles. Thus a mode m-2 (four poles) would normally use eight electrodes (per side if double field); m-3, (six poles), 12 electrodes; m-4 (eight poles) 16 electrodes and so on. For illustration of a mode m-2 only will be described, but other configurations may be used in certain circumstances.

Referring to FIGS. 15(a) and (b), and retaining a single "field" model for convenience, it can be seen that a similarity is maintained with the original form, whether the electrodes be formed from a common apex 90 having a measurable resistance per square as in FIG. 15(a) or where the electrodes 92 are themselves full conductive, but returned to a common "apex" 94 connection via separate resistance elements 96 as in FIG. 15(b).

Accordingly for the forms described above the electric circuit and rate measurement means remain essentially unchanged from those previously described.

It is however also possible to use discrete electrodes of conductive form (negligible resistance), as to be described below.

Referring to FIG. 16, the electrodes 90 are positioned as previously described in relation to FIG. 14 but this time are of negligible resistance. For the m-2, four pole model, the electrodes 90 are diagonally connected by wires or strips 92.

One pair $L_d$ and $R_d$ are chosen as drive electrodes the other $L_s$ and $R_s$ as signal electrodes.

In the open loop form as shown in FIG. 17, a common single phase supply drive voltage 94 is applied to $L_d$ and $R_d$ while signals from $L_s$ and $R_s$ are differenced at 96 and detected, for a rate input, through a phase sensitive detector 98, its reference derived from the A.C. drive voltage to the drive electrodes $L_d$ and $R_d$.

In the closed loop form (for improved bandwidth and linearity), as shown in FIG. 18, the drive voltage source is split to two drive electrodes $L_d$ and $R_d$ same source 94, while additional small components of this voltage are added to each electrode so that, with no rate applied, the electrode voltages are identical (for a well manufactured balanced device). In the event a rate is applied, a differential output signal is phase sensitive detected at 98 from the signal electrodes $L_s$ and $R_s$, which is used to apply a correcting or nulling action, through gain controls 100 which act to increase the drive voltage to one of the drive electrodes (e.g. $R_d$) and decrease the drive voltage to the other (e.g. $L_d$) in equal portions (a perfect match is not essential but preferred).

The amplitude of this voltage component is a measure of the drive spatial shift required to counteract the rate induced spatial shift of the vibrations under the signal electrodes. These components are phase sensitive detected via a difference amplifier 102, the phase reference derived from the drive voltage sum (mean), to give a rate signal output.

Automatic tuning and scaling compensations are also applicable to this alternative form and are shown in FIG. 19. These are of the type described earlier in connection with FIGS. 9, 10 and 13. Thus, there is a phase lock loop 104 to bring the current and voltage into phase, a current loop 106 and a damping correction loop 108 for scale factor compensation. (Null adjustment of output is achieved by selecting the feedback resistors to spatially advance or retard the drive).

It will be understood that, although the above embodiments show disc-shaped resonators, other resonators may be used, e.g. of the forms shown in FIG. 2.

The following advantages accrue from the described embodiments:

Electrode mass unbalance effects are minimised where electrodes are continuously formed across the faces of the piezoelectric element.

The "continuous" electrode form avoids manufacturing process difficulties in machining multi-electrodes to a precise form in a precise position.

Push pull modal driving forces are produced from a single phase supply.

The state of tune or power factor of the resonator is not inherently critical to maintaining a stable null.

The electrical configuration is well suited to automatic control of tuning via a phase locked loop and, provides a simple means to extract rate signal while compensating scale factor change with temperature.

Signals under the poles can be balanced using external resistance to modify the state of balance of the sensor bridge.

Feed back can be readily applied to extend the bandwidth of the open loop device and improve linearity.

Discrete electrodes can be adopted as an alternative to continuous electrodes where this should be preferred.

With regard to bias the bi-poling arrangement can be driven by a single phase A.C. voltage to excite m-n modes of hoop vibration in a piezo element. This is because the sign of the piezo strain coefficient is reversed in passing from one pole to the next. The hoop strain (h) is at a maximum (tensile or compressive) when the velocity (v) is zero. For the hoop strain the voltage generated is in phase with the strain (FIG. 20(a)). For the resonant structure the driving voltage and velocity v are in phase (FIG. 20(b)). It can accordingly be seen, as shown in FIGS. 20(a)–20(d), that this mechanism (in a well balanced device) can prevent hoop strain quadrature signal voltage from appearing at the lead out points of the electrodes, in the bridge arrangement of FIGS. 11 et sec, since the commoning together of left hand (L) signal points and then right hand (R) signal points places individual quadrature hoop generators into a common shorting loop so that hoop strain change stays confined within the element; wherein T is the tension and C is the compression. This means that the burden of rejecting the quadrature signal electronically is much reduced, which in turn will work favourably in reducing bias dependency on fine precision tuning. The quadrature voltage is shorted when L1, L2, L3 and L4 are commoned and R1, R2, R3 and R4 are similar.

Where the discrete electrode arrangement, as shown in FIGS. 17 through 19, is adopted, quadrature voltages appearing at the signal electrodes are first presented to a difference amplifier with a high common mode rejection. this will accordingly reduce quadrature voltage throughput to the signal phase sensitive detector.

Scale factor compensations are based firstly on maintaining a constant A.C. supply current through the piezo element, akin to the velocity of the vibrations upon which Coriolis force is dependent. This assumes that the mobility of charge electrons directly relates to the mobility of the structure.

The "forward" scale factor correction is made, in addition to the current compensation, by scaling output up or down according to the observed mean voltage across the piezo element, so correcting for change in the piezo coefficient(s).

Thus it is expected that scale factor variation with temperature or time will be much reduced (to an extent that residual effects should be easily modelable with temperature change).

Manufacturing aspects are different from conventional uni-poled devices; however, the poling is simple to repeat, since it can be based on a simple tool which will repeat each time given that voltages are held to fixed levels of D.C. An accurate reference mark or datum for spatially fixing a ball or wedge bonded wires to the electrode(s) is required. Forming of a continuous evenly distributed resistance surface using thin film technology is already well established. One possible method is the rotation of the piezo element while releasing a sublimation of metal.

Cost to make this device should be comparable with the uni-pole device with some advantage if yield rates are higher because less skill is required in manufacture where masking is not required.

Electronic costs again should be comparable but with some possible cost-saving over a micro-controller compensator, since the latter can incur a high cost.

The material is poled using well established techniques. The material is raised above the curie temperature, an electric field is applied across the region where the pole is to be formed and the material is then allowed to cool below the curie temperature.

A further advantage in the alternate multiple arrangement is that it allows the material to be excited using a single phase signal and also simplifies the electrode configuration. Both these features can help preserve the phase information in the output signals and thus increase accuracy.

I claim:

1. A vibrating surface gyroscope having a sensing axis, comprising:
   excitation means for supplying a single phase supply signal;
   a resonator structure of bi-poled piezoelectric material, the piezoelectric material including a plurality of pole regions of alternate polarity, said pole regions being responsive to said single phase supply signal for setting up local tensile or compressive strain in said resonator structure to establish a predetermined modal pattern of vibration; and
   rotation determining means for determining a rotation of said gyroscope based on an electric field generated by the vibration of said resonator structure.

2. A vibrating surface gyroscope according to claim 1, wherein said pole regions are equispaced about said sensing axis.

3. A vibrating surface gyroscope according to claim 1, wherein said resonator structure is generally disc-shaped at rest.

4. A vibrating surface gyroscope according to claim 1, wherein said resonator structure is of hollow cylindrical shape.

5. A vibrating surface gyroscope according to claim 1, wherein said resonator structure is of part spherical shape.

6. A vibrating surface gyroscope according to claim 1, wherein said excitation means includes at least first and second electrode means provided on two opposed surfaces of said resonator structure, and at least one of said first and second electrode means has a surface resistivity comparable to the reactance of said piezoelectric material when said resonator structure is set into resonance and generates a surface electric field across said first and second electrode means.

7. A vibrating surface gyroscope according to claim 6, wherein said first electrode means comprises a single continuous electrode.

8. A vibrating surface gyroscope according to claim 6, wherein said first electrode means comprises a plurality or discrete electrodes.

9. A vibrating surface gyroscope according to claim 6, wherein said first electrode means and said resonator structure are configured as an electrical bridge circuit, with an output of said bridge circuit providing an indication of the rotation applied to said gyroscope.

10. A vibrating surface gyroscope according to claim 1, wherein said rotation determining means includes sampling means for sampling the electrical field generated by vibration of said resonator structure at a number of points disposed around said sensing axis, whereby a shift in the electrical field induced by rotation of said gyroscope may be determined.

11. A vibrating surface gyroscope according to claim 1, wherein said pole regions are distributed circumferentially around said sensing axis such that said pole regions lie on an imaginary sinwave.

12. A vibrating surface gyroscope according to claim 1, wherein said pole regions are distributed circumferentially around said sensing axis such that said pole regions lie on an imaginary square wave.

13. A vibrating surface gyroscope according to claim 1, comprising scale factor compensation means for compensating variations in at least one of the displacement or amplitude of the vibration of the resonator structure and a damping resistance of said resonator structure.

14. A vibrating surface gyroscope according to claim 1, including means for causing the current and voltage of said single phase supply signal applied to said resonator structure to be substantially in phase.

15. A vibrating surface gyroscope according to claim 1, wherein said means for exciting includes at least a first and second electrode means provided on two respective opposed surfaces of said resonator structure and wherein at least one of said first and second electrode means has a resistance per area comparable to the reactance of the piezoelectric material when the resonator structure is set into resonance at its resonant frequency.

16. A vibrating surface gyroscope according to claim 15, wherein both of said first and second electrode means have a resistance per area comparable to the reactance of the piezoelectric material when the resonator structure is set into resonance at the resonant frequency.

17. A vibrating surface gyroscope according to claim 15, wherein at least one of said first and second electrode means comprise a single continuous electrode.

18. A vibrating surface gyroscope according to claim 15, wherein at least one of said first and second electrode means comprise a plurality of discrete electrodes.

19. A vibrating surface gyroscope according to claim 1, wherein said excitation means includes first and second electrode means, said first and second electrode means each comprise at least one diagonally opposed pair of interconnected electrode elements.

20. A vibrating surface gyroscope according to claim 19, wherein said electrode elements are each disposed between respective peak and zero pole regions.

21. A vibrating surface gyroscope according to claim 1, wherein said excitation means includes first and second electrode means, and amplitudes of signals supplied to said first electrodes are controlled in accordance with amplitudes of signals detected by said second electrode means to counteract rotation-induced shift in the electrical field detected by said second electrode means.

22. A vibrating surface gyroscope comprising a sensing axis, a piezoelectric resonator structure, means for applying a signal to excite said piezoelectric resonator structure to resonate, means responsive to an electrical field generated by vibration of said piezoelectric resonator structure to determine the rotation of said gyroscope, and means for causing the current and voltage of said signal applied to said piezoelectric resonator structure to be substantially in phase, wherein said piezoelectric resonator structure includes a plurality of pole regions of alternate polarity disposed around said sensing axis and each responsive to said signal to set up a local tensile or compressive strain dependent on the polarity of said pole region to establish a predetermined modal pattern of vibration.

23. A vibrating surface gyroscope, comprising a sensing axis, a piezoelectric resonator structure, means for exciting said structure and detector means responsive to the electrical field generated on excitation of said resonator structure to determine applied rotation, said excitation means including means for applying an alternating excitation signal to said resonator structure, wherein said gyroscope includes means operable in use to control said excitation means to bring the voltage of said excitation signal substantially into phase with the current thereof.

24. A vibrating surface gyroscope according to claim 23, including means for sampling the electric field on said resonator structure and means for applying at least partial scale factor compensation for changes in displacement or amplitude of vibrations of said resonator structure, said means for applying at least partial compensation comprising an automatic gain control circuit for controlling the magnitude of the voltage of the excitation signal to maintain the current thereof at a preset magnitude.

25. A vibrating surface gyroscope according to claim 24, including means for applying at least partial scale factor compensation for changes in damping resistance of the resonator structure, comprising means responsive to the voltage sampled by said sampling means to control a gain term in said detector means.

26. A vibrating surface gyroscope, comprising:
a sensing axis,
a resonator structure of bi-poled piezoelectric material, the piezoelectric material including a plurality of pole regions of alternate polarity, said pole regions being responsive to a single phase excitation signal for setting up local tensile or compressive strain in said piezoelectric structure to establish a predetermined modal pattern of vibration,
excitation means for applying said single phase excitation signal across said resonator structure and including at least first and second electrode means of predetermined surface resistivity, and obtaining means for obtaining at least two field sample signals representing the electric field across said resonator structure at spaced locations, the electrode means and the resonator structure together defining a bridge circuit, and adjusting means for adjusting said bridge circuit to equalize said sample signals.

27. A vibrating surface gyroscope according to claim 26, wherein said adjusting means comprises at least one adjustable resistance.

28. A vibrating surface gyroscope according to claim 26, wherein said adjusting means includes means for injecting current into the bridge circuit.

29. A vibrating surface gyroscope according to claim 28, wherein said adjusting means includes means for phase-splitting the output of the bridge into two components and returning the components to the bridge to equalize said sample signals.

30. A vibrating surface gyroscope comprising a sensing axis, a piezoelectric resonator structure, first electrode means for exciting said piezoelectric resonator structure, second electrode means for detecting the electrical field generated in response to excitation of said piezoelectric resonator structure, said piezoelectric resonator structure having therein a plurality of pole regions of alternate polarity disposed about said sensing axis, said first and second electrode means each comprising discrete electrodes, wherein said first and second electrode means each comprise at least one diagonally opposed pair of interconnected electrode elements.

31. A vibrating surface gyroscope according to claim 30, wherein said electrode elements are each disposed between respective peak and zero poled regions.

32. A vibrating surface gyroscope comprising a sensing axis, a piezoelectric resonator structure, first electrode means for exciting said piezoelectric resonator structure, second electrode means for detecting the electrical field generated in response to excitation of said piezoelectric resonator structure, said piezoelectric resonator structure having therein a plurality of pole regions of alternate polarity disposed about said sensing axis, said first and second electrode means each comprising discrete electrodes, wherein amplitudes of signals supplied to said first electrodes are controlled in accordance with amplitudes of signals detected by said second electrode means to counteract rotation-induced shift in the electrical field detected by said second electrode means.

* * * * *